(12) United States Patent
Bao et al.

(10) Patent No.: US 8,937,143 B2
(45) Date of Patent: Jan. 20, 2015

(54) TEMPERATURE CONTROLLED SOL-GEL CO-CONDENSATION

(71) Applicant: Novan, Inc., Durham, NC (US)

(72) Inventors: Jian Bao, Cary, NC (US); Nathan Stasko, Durham, NC (US); Eleftherios Kougoulos, Morrisville, NC (US)

(73) Assignee: Novan, Inc., Durham, NC (US)

( * ) Notice: Subject to any disclaimer, the term of this patent is extended or adjusted under 35 U.S.C. 154(b) by 0 days.

(21) Appl. No.: 13/946,186

(22) Filed: Jul. 19, 2013

(65) Prior Publication Data

US 2013/0310533 A1 Nov. 21, 2013

Related U.S. Application Data

(63) Continuation of application No. PCT/US2012/022048, filed on Jan. 20, 2012.

(60) Provisional application No. 61/434,478, filed on Jan. 20, 2011.

(51) Int. Cl.
*C08G 77/26* (2006.01)

(52) U.S. Cl.
CPC ..................... *C08G 77/26* (2013.01)
USPC .................. 528/38; 528/21; 528/39

(58) Field of Classification Search
None
See application file for complete search history.

(56) References Cited

U.S. PATENT DOCUMENTS

| 3,291,760 | A | 12/1966 | Bayer |
| 4,609,752 | A | 9/1986 | Giesing et al. |
| 2006/0063011 | A1 | 3/2006 | Hasskerl et al. |
| 2008/0045736 | A1 | 2/2008 | Zhang et al. |
| 2009/0214618 | A1 | 8/2009 | Schoenfisch et al. |
| 2010/0297200 | A1 | 11/2010 | Schoenfisch et al. |
| 2012/0134951 | A1 | 5/2012 | Stasko et al. |

FOREIGN PATENT DOCUMENTS

WO   WO 2006/128121 A2   11/2006

OTHER PUBLICATIONS

"Synthesis of Nitric Oxide-Releasing Silica Nanoparticles" authored by Schoenfisch et al. and published in the Journal of the American Chemical Society (2007), 127, 4612-4619.*
Notification of Transmittal of the International Search Report and the Written Opinion of the International Searching Authority, or the Declaration, mailed May 10, 2012 (8 Pages).
Extended European Search Report Corresponding to European Patent Application No. 12736974.2; Date of Mailing: Jul. 28, 2014.
Shin et al., "Synthesis of Nitric Oxide-Releasing Silica Nanoparticles", *Journal of the American Chemical Society*, 2007, 129(22): 4612-4619.
Chinese Office Action Corresponding to Chinese Patent Application No. 201280005083.2; issued Sep. 26, 2014.

* cited by examiner

*Primary Examiner* — Marc Zimmer
(74) *Attorney, Agent, or Firm* — Myers Bigel Sibley & Sajovec, P.A.

(57) ABSTRACT

Provided according to some embodiments of the invention are methods of making co-condensed macromolecules that include forming a reaction mixture by combining at leak one reactant and at least one reagent at a first temperature at which the at least one reactant is substantially unreactive in the presence of the at least one reagent; raising the temperature of the reaction mixture to a second temperature at which the at least one reactant is reactive in the presence of the at least one reagent, wherein the reaction of the at least one reactant in the presence of the at least one reagent produces co-condensed macromolecules such as co-condensed silica macromolecules.

19 Claims, No Drawings

TEMPERATURE CONTROLLED SOL-GEL CO-CONDENSATION

CLAIM OF PRIORITY

This application is a continuation under 35 U.S.C. §111(a) of PCT Application No. PCT/US2012/022048, filed on Jan. 20, 2012, which claims the benefit, under 35 U.S.C. §119, of U.S. Provisional Patent Application Ser. No. 61/434,478 filed Jan. 20, 2011, the disclosure of each of which is incorporated herein by reference as if set forth in its entirety.

STATEMENT OF GOVERNMENT SUPPORT

This invention was made with government support under grant number 13531 awarded by the National Science Foundation. The United States Government has certain rights in this invention.

BACKGROUND OF THE INVENTION

Silica co-condensation is useful in material science to make polysiloxane macromoleclues with specific chemical and physical properties. It may be desirable to control physical and chemical compositions of silica macromoleclues, particularly those silica macromoleclues used in healthcare products such as medical devices and pharmaceutical compositions.

In silica co-condensation, different silane monomers may be mixed prior to the addition of catalyst and/or additional reagents that may initiate the condensation. The silane mixture may then be added at a controlled speed in a reactor that holds the catalyst and/or the other reagents. Once the silane monomer mixture is combined with the catalyst and/or other reagents, the co-condensation reaction begins. However, it may be difficult to obtain a homogeneous solution via controlling the speed of addition and/or the agitation of the mixture, particularly if the silane mixture includes basic monomers such as aminosilanes, which may self-catalyze during the co-condensation reaction. Inhomogeneity of the solution may affect the composition and properties of the resulting co-condensed macromolecules.

Methods that decrease or eliminate the problem of inhomogeneity in the co-condensation reaction mixture would be desirable.

SUMMARY OF THE INVENTION

Provided according to some embodiments of the invention are methods of making co-condensed macromolecules that include forming a reaction mixture by combining at least one reactant and at least one reagent at a first temperature at which the at least one reactant is substantially unreactive in the presence of the at least one reagent; raising the temperature of the reaction mixture to a second temperature at which the at least one reactant is reactive in the presence of the at least one reagent, wherein the reaction of the at least one reactant in the presence of the at least one reagent produces co-condensed silica macromolecules, such as co-condensed silica macromolecules.

In some embodiments, the at least one reactant includes at least one silane monomer. In some embodiments, the at least one reactant includes at least two silane monomers. In some embodiments, a first of the at least two silane monomers includes an inorganic silane monomer and a second of the at least two silane monomers includes an organic silane monomer. In some embodiments, the at least one silane monomer includes a diazeniumdiolated aminosilane.

In some embodiments, the at least one reagent includes a base, and in some embodiments, the at least one reagent includes a solvent.

In some embodiments, the first temperature is less than −5° C., and in some embodiments, less than −10° C. In some embodiments, the second temperature is greater than 0° C., and in some embodiments, greater than 5° C.

In some embodiments of the invention, methods further include (a) maintaining the reaction temperature of the reaction mixture at the second temperature; and/or (b) raising the temperature of the reaction mixture to a third temperature that is not less than the second temperature. In some embodiments, the third temperature is greater than the second temperature and raising the reaction temperature of the reaction mixture includes increasing the second temperature to the third temperature at a rate of between about 0.1° C. per minute and 10° C. per minute.

In some embodiments, methods further include increasing uniformity or homogeneity of the reaction mixture prior to raising the temperature of the reaction mixture. In some embodiments, methods of increasing uniformity of the reaction mixture include at least one of stirring, mixing, mechanical agitation, high shear homogenization, and/or ultrasound.

In some embodiments of the invention, the co-condensed silica macromolecules include nanoparticles and/or microparticles. In some embodiments, the method provides greater than one gram of co-condensed silica per 0.5 liters of reaction mixture. Furthermore, in some embodiments, methods provide a yield of co-condensed silica macromolecules of greater than 10%.

DETAILED DESCRIPTION OF EMBODIMENTS OF THE INVENTION

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items. Furthermore, the term "about," as used herein when referring to a measurable value such as an amount of a compound, dose, time, temperature, and the like, is meant to encompass variations of 20%, 10%, 5%, 1%, 0.5%, or even 0.1% of the specified amount. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

All patents, patent applications and publications referred to herein are incorporated by reference in their entirety. In the event of conflicting terminology, the present specification is controlling.

The embodiments described in one aspect of the present invention are not limited to the aspect described. The embodiments may also be applied to a different aspect of the invention as long as the embodiments do not prevent these aspects of the invention from operating for its intended purpose.

Chemical Definitions

As used herein the term "alkyl" refers to $C_{1-20}$ inclusive, linear (i.e., "straight-chain"), branched, or cyclic, saturated or at least partially and in some cases fully unsaturated (i.e., alkenyl and alkynyl)hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. Exemplary branched alkyl groups include, but are not limited to, isopropyl, isobutyl, tert-butyl. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms, "Higher alkyl" refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to $C_{1-5}$ straight-chain alkyls. In other embodiments, "alkyl" refers, in particular, to $C_{1-5}$ branched-chain alkyls.

Alkyl groups can optionally be substituted (a "substituted alkyl") with one or more alkyl group substituents, which can be the same or different. The term "alkyl group substituent" includes but is not limited to alkyl, substituted alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. There can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

Thus, as used herein, the term "substituted alkyl" includes alkyl groups, as defined herein, in which one or more atoms or functional groups of the alkyl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto.

The term "aryl" is used herein to refer to an aromatic substituent that can be a single aromatic ring, or multiple aromatic rings that are fused together, linked covalently, or linked to a common group, such as, but not limited to, a methylene or ethylene moiety. The common linking group also can be a carbonyl, as in benzophenone, or oxygen, as in diphenylether, or nitrogen, as in diphenylamine. The term "aryl" specifically encompasses heterocyclic aromatic compounds. The aromatic ring(s) can comprise phenyl, naphthyl, biphenyl, diphenylether, diphenylamine and benzophenone, among others. In particular embodiments, the term "aryl" means a cyclic aromatic comprising about 5 to about 10 carbon atoms, e.g., 5, 6, 7, 8, 9, or 10 carbon atoms, and including 5- and 6-membered hydrocarbon and heterocyclic aromatic rings.

The aryl group can be optionally substituted (a "substituted aryl") with one or more aryl group substituents, which can be the same or different, wherein "aryl group substituent" includes alkyl, substituted alkyl, aryl, substituted aryl, aralkyl, hydroxyl, alkoxyl, aryloxyl, aralkyloxyl, carboxyl, acyl, halo, nitro, alkoxycarbonyl, aryloxycarbonyl, aralkoxycarbonyl, acyloxyl, acylamino, aroylamino, carbamoyl, alkylcarbamoyl, dialkylcarbamoyl, arylthio, alkylthio, alkylene, and —$NR^1R''$, wherein $R^1$ and $R''$ can each be independently hydrogen, alkyl, substituted alkyl, aryl, substituted aryl, and aralkyl.

Thus, as used herein, the term "substituted aryl" includes aryl groups, as defined herein, in which one or more atoms or functional groups of the aryl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto. Specific examples of aryl groups include, but are not limited to, cyclopentadienyl, phenyl, furan, thiophene, pyrrole, pyran, pyridine, imidazole, benzimidazole, isothiazole, isoxazole, pyrazole, pyrazine, triazine, pyrimidine, quinoline, isoquinoline, indole, carbazole, and the like.

"Cyclic" and "cycloalkyl" refer to a non-aromatic mono- or multicyclic ring system of about 3 to about 10 carbon atoms, e.g., 3, 4, 5, 6, 7, 8, 9, or 10 carbon atoms. The cycloalkyl group can be optionally partially unsaturated. The cycloalkyl group also can be optionally substituted with an alkyl group substituent as defined herein, oxo, and/or alkylene. There can be optionally inserted along the cyclic alkyl chain one or more oxygen, sulfur or substituted or unsubstituted nitrogen atoms, wherein the nitrogen substituent is hydrogen, alkyl, substituted alkyl, aryl, or substituted aryl, thus providing a heterocyclic group. Representative monocyclic cycloalkyl rings include cyclopentyl, cyclohexyl; and cycloheptyl. Multicyclic cycloalkyl rings include adamantyl, octahydronaphthyl, decalin, camphor, camphane, and noradamantyl.

"Alkoxyl" refers to an alkyl-O— group wherein alkyl is as previously described. The term "alkoxyl" as used herein can refer to, for example, methoxyl, ethoxyl, propoxyl, isopropoxyl, butoxyl, f-butoxyl, and pentoxyl. The term "oxyalkyl" can be used interchangeably with "alkoxyl". In some embodiments, the alkoxyl has 1, 2, 3, 4, or 5 carbons.

"Aralkyl" refers to an aryl-alkyl group wherein aryl and alkyl are as previously described, and included substituted aryl and substituted alkyl. Exemplary aralkyl groups include benzyl, phenylethyl, and naphthylmethyl.

"Alkylene" refers to a straight or branched bivalent aliphatic hydrocarbon group having from 1 to about 20 carbon atoms, e.g., 1, 2, 3, 4, 5, 6, 7, 8, 9, 10, 11, 12, 13, 14, 15, 16, 17, 18, 19, or 20 carbon atoms. The alkylene group can be straight, branched or cyclic. The alkylene group also can be optionally unsaturated and/or substituted with one or more "alkyl group substituents." There can be optionally inserted along the allylene group one or more oxygen, sulfur or substituted or unsubstituted nitrogen atoms (also referred to herein as "alkylaminoalkyl"), wherein the nitrogen substituent is alkyl as previously described. Exemplary alkylene groups include methylene (—$CH_2$—); ethylene (—$CH_2$—$CH_2$—); propylene (—$(CH_2)_3$—); cyclohexylene (—$C_6H_{10}$—); —CH=CH—CH=CH—; —CH=CH—$CH_2$—; wherein each of q and r is independently an integer from 0 to about 20, e.g., 0, 1, 2, 3, 4, 5, 6, 7, 8, 9, 10, 11, 12, 13, 14, 15, 16, 17, 18, 19, or 20, and R is hydrogen or lower alkyl; methylenedioxyl (—O—$CH_2$—O—); and ethylenedioxyl (—O—(CH$_2$)$_2$—O—). An alkylene group can have about 2 to about 3 carbon atoms and can further have 6-20 carbons.

"Arylene" refers to a bivalent aryl group. An exemplary arylene is phenylene, which can have ring carbon atoms available for bonding in ortho, meta, or para positions with regard to each other, i.e., respectively. The arylene group can also be napthylene. The arylene group can be optionally substituted (a "substituted arylene") with one or more "aryl group substituents" as defined herein, which can be the same or different.

"Aralkylene" refers to a bivalent group that contains both alkyl and aryl groups. For example, aralkylene groups can have two alkyl groups and an aryl group (i.e., -alkyl-aryl-alkyl-), one alkyl group and one aryl group (i.e., -alkyl-aryl-) or two aryl groups and one, alkyl group (i.e., -aryl-alkyl-aryl-).

The term "amino" refers to nitrogen-containing groups —NR$^1$R$^2$, wherein R$^1$ and R$^2$ can each be independently hydrogen, alkyl, substituted alkyl, aryl, substituted aryl, and aralkyl, alkylene, arylene, aralkylene. Thus, "amine" as used herein can refer to a primary amine, a secondary amine, or a tertiary amine. In some embodiments, one R of an amino group can be a cation stabilized diazeniumdiolate (i.e., NONO$^-$X$^+$). The terms "cationic amine" and "quaternary amine" refer to an amino group having an additional R group (—N$^+$R$^1$R$^2$R$^3$)X$^-$, such as a hydrogen or an alkyl group bonded to the nitrogen. Thus, cationic and quaternary amines carry a positive charge, and so may be associated with a counterion (X$^-$), such as a halide or other known counterion for quaternary amines.

The term "alkylamine" refers to the -alkyl-NH$_2$ group.
The term "carbonyl" refers to the —(C=O)— group.
The term "carboxyl" refers to the —COOH group and the term "carboxylate" refers to an anion formed from a carboxyl group, i.e., —COO$^-$.

The terms "halo", "halide", or "halogen" as used herein refer to fluoro, chloro, bromo, and iodo groups.

The term "hydroxyl" and "hydroxy" refer to the —OH group.

The term "hydroxyalkyl" refers to an alkyl group substituted with an —OH group.

The term "mercapto" or "thio" refers to the —SH group.
The term "silyl" refers to groups comprising silicon atoms (Si).

The term "silane" refers to any compound that includes four organic groups, such as including any of the organic groups described herein (e.g., alkyl, aryl and alkoxy), bonded to a silicon atom.

As used herein the term "alkoxysilane" refers to a silane that includes one, two, three, or four alkoxy groups bonded to a silicon atom. For example, tetraalkoxysilane refers to Si(OR)$_4$, wherein R is alkyl. Each alkyl group can be the same or different. An "alkylalkoxysilane" refers to an alkoxysilane wherein one or more of the alkoxy groups has been replaced with an alkyl group. Thus, an alkylalkoxysilane comprises at least one alkyl-Si bond.

The term "fluorinated silane" refers to an alkylsilane wherein one of the alkyl groups is substituted with one or more fluorine atoms.

The term "cationic or anionic silane" refers to an alkylsilane wherein one of the alkyl groups is further substituted with an alkyl substituent that has a positive (i.e., cationic) or a negative (i.e. anionic) charge, or can become charged (i.e., is ionizable) in a particular environment (i.e., in vivo).

The term "silanol" refers to a Si—OH group.

Provided herein according to some embodiments of the invention are methods of making co-condensed macromolecules, such as co-condensed silica macromolecules. In some embodiments of the invention, provided are methods of making co-condensed silica macromolecules that include forming a reaction mixture by combining at least one reactant and at least one reagent at a first temperature at which the at least one reactant is substantially unreactive in the presence of the at least one reagent (also referred to herein as "the first temperature"); and raising the temperature of the reaction mixture to a second temperature at which the at least one reactant is reactive in the presence of the at least one reagent (also referred to herein as "the second temperature"). As such, the reaction of the at least one reactant in the presence of the at least one reagent produces co-condensed macromolecules such as co-condensed silica macromolecules. Co-condensed silica macromolecules can be entirely silica or other network forming elements may be included therein.

Reactants and Reagents

As described above, the reaction mixture includes at least one reactant and at least one reagent. As used herein, the term "reactant" refers to a compound that is consumed during the reaction, while the term "reagent" refers to a compound or substance that is added to the reaction mixture to facilitate the reaction but is not consumed.

Any suitable reactant employed in sol-gel processes may be used. The sol-gel process includes two chemical steps, the hydrolysis and the condensation, which normally occur simultaneously, once hydrolysis is initiated. The products from derived from sol-gel processes may include bioactive glasses and other organic-inorganic special materials. In some embodiments of the invention, the at least one reactant is a monomeric, metal or semimetal alkoxide precursor M(OR)n, where M is network-forming element such as Si, Ge; Ti, Zr, Al, B, and the like, R is an organic group such as an alkyl and n is typically 1, 2, 3 or 4.

In some embodiments of the invention, the at least one reactant includes a silane monomer. Any suitable silane monomer may be used. For example, in some embodiments, the silane may be an inorganic silane and in some embodiments, the silane, is an organic silane. Furthermore, in some embodiments, mixtures of inorganic and/or organic silanes may be used. However, in some embodiments, the silane monomer may include alkoxysilane, such as a tetraalkoxysilane having the formula Si(OR)$_4$, wherein R is an alkyl group. The R groups can be the same or different. In some embodiments the tetraalkoxysilane is selected as tetramethyl orthosilicate (TMOS) or tetraethyl orthosilicate (TEOS). In some embodiments, the silane monomer may include aminoalkoxysilane. In some embodiments, the aminoalkoxysilane has the formula: R"—(NH—R')$_n$—Si(OR)$_3$, wherein R is alkyl, R' is alkylene, branched alkylene, or aralkylene, n is 1 or 2, and R" is selected from the group consisting of alkyl, cycloalkyl, aryl, and alkylamine.

In some embodiments, the aminoalkoxysilane can be selected from N-(6-aminohexyl)aminopropyltrimethoxysilane (AHAP3); N-(2-aminoethyl)-3-aminopropyltrimethoxysilane (AEAP3); (3-trimethoxysilylpropyl)di-ethylenetriamine (DET3); (aminoethylaminomethyl) phenethyltrimethoxysilane (AEMP3); [3-(methylamino) propyl]trimethoxysilane (MAPS); N-butylaminopropyltrimethoxysilane(n-BAP3); t-butylaminopropyltrimethoxysilane(t-BAP3); N-ethylaminoisobutyltrimethoxysilane(EAiB3); N-phenylamino-propyltrimethoxysilane (PAP3); and N-cyclohexylaminopropyltrimethoxysilane (cHAP3).

In some embodiments, the aminoalkoxysilane has the formula: NH[R'—Si(OR)$_3$]$_2$, wherein R is alkyl and R' is alkylene. In some embodiments, the aminoalkoxysilane can be selected from bis(3-triethoxysilylpropyl)amine, bis-[3-(trimethoxysilyl)propyl]amine and bis-[(3-trimethoxysilyl)propyl]ethylenediamine.

In some embodiments of the invention, the nitric oxide donor may be formed from an aminoalkoxysilane by a pre-charging method, and the co-condensed siloxane network may be synthesized from the condensation of a silane mixture that includes an alkoxysilane and the aminoalkoxysilane to form a nitric oxide donor modified co-condensed siloxane network. As used herein, the "pre-charging method" means that aminoalkoxysilane is "pretreated" or "precharged" with nitric oxide prior to the co-condensation with alkoxysilane. In some embodiments, the precharging nitric oxide may be accomplished by chemical methods. In another embodiment, the "pre-charging" method can be used to create co-condensed siloxane networks and materials more densely functionalized with NO-donors.

In some embodiments, as described herein above, the aminoalkoxysilane is precharged for NO-release and the amino group is substituted by a diazeniumdiolate. Therefore, in some embodiments, the aminoalkoxysilane has the formula: R"—N(NONO$^-$X$^+$)—. R'—Si(OR)$_3$, wherein R is alkyl, R' is alkylene or aralkylene, R" is alkyl or alkylamine, and X$^+$ is a cation selected from the group consisting of Na$^+$, K$^+$ and Li$^+$.

In some embodiments of the invention, the co-condensed siloxane network further includes at least one crosslinkable functional moiety of formula (R$^1$)$_x$(R$^2$)$_y$SiR$^3$, wherein R$^1$ and R$^2$ is each independently C$_{1-5}$ alkyl or C$_{1-5}$ alkoxyl, X and Y is each independently 0, 1, 2, or 3, and X+Y equal to 3, and R$^3$ is a crosslinkable functional group. In a further embodiment, R$^1$ is C$_{1-3}$ alkoxyl, and R$_2$ is methyl. In another embodiment, R$_3$ is selected from the group consisting of acrylo, alkoxy, epoxy, hydroxy, mercapto, amino, isocyano, carboxy, vinyl and urea. R$^3$ imparts an additional functionality to the silica which results in a multifunctional device. Yet, in another embodiment, the crosslinkable functional moiety is selected from the group consisting of methacryloxymethyltrimethoxysilane, methacryloxypropyltrimethoxysilane, methacryloxypropyltriethoxysilane, 3-acryloxypropyl)trimethoxysilane, N-(3-methyacryloxy-2-hydroxypropyl)-3-aminopropyltriethoxysilane, 5,6-epoxyhexyltriethoxysilane, 2-(3,4-epoxycyclohexyl)ethyl trimethoxysilane, 3-glycidoxypropyl)trimethoxysilane, 3-aminopropyltrimethoxysilane, 3-aminopropyltriethoxysilane, 3-isocyanatopropyltriethoxysilane, 3-mercaptopropyltrimethoxysilane, mercaptopropyltriethoxysilane, 11-mercaptoundecyltrimethoxysilane, 2-cyanoethyltriethoxysilane, ureidopropyltriethoxysilane, ureidopropyltrimethoxysilane, vinylmethyldiethoxysilane, vinylmethyldimethoxysilane, vinyltriethoxysilane, vinyltrimethoxysilane, vinyltriisopropoxysilane and vinyltris(2-methoxyethoxy)silane. In some embodiments, R$^3$ may be used to cross-link the NO-donor modified silica with or within polymeric matrices.

Additional silane monomers are described in U.S. Publication No, 2009/0214618, U.S. patent application Ser. No. 13/256,928, filed Sep. 15, 2011; and U.S. Provisional Application No. 61/526,918, filed Aug. 24, 2011. The content of each of these references is incorporated herein by reference in its entirety.

Any suitable reagent may be included in the reaction mixture, including, for example, catalysts, solvents, and other additives. Any suitable catalyst may be used, including mixtures of catalysts. However, in some embodiments, the catalyst includes a basic catalyst such as ammonium hydroxide, dimethyl amine, diethyl amine, or other alkyl amines with formula of NR$^1$R$^2$R$^3$, in which R$^1$, R$^2$, R$^3$ are each independently hydrogen or C$_{1-5}$ alkyl groups. Other examples of basic catalysts include inorganic salts that have high solubility in wet alcoholic solvents such as sodium acetate, sodium bicarbonate and etc. The catalyst may be present at any suitable concentration in the reaction mixture. However, in some embodiments, the catalyst is present at a concentration in a range of 0.1 M to 5.0 M, in some embodiments, in a range of 0.8 M to 1.2 M, and in some embodiments, in a range of 1-1.1 M.

Any suitable solvent, including mixtures of solvents, may be included in the reaction mixture. Examples of solvents include acetone, methyl alcohol, ethanol, isopropanol, butyl alcohol, ethyl acetate, dimethyl isosorbide, propylene glycol, glycerol, ethylene glycol, polyethylene glycol, diethylene glycol monoethyl ether or mixtures thereof. In particular examples, the solvent includes ethanol and/or isopropanol.

Any suitable additional additives/reagents may be added, and such additional reagents are known to those of skill in the art. Additional examples may be found in U.S. Publication No. 2009/0214618, the contents of which are hereby incorporated by reference in its entirety.

Forming the Reaction Mixture

The reaction mixture is formed by combining at least one reactant and at least one reagent at a first temperature. Any suitable method of forming a reaction mixture may be used, including simple addition of the components or via a device such as a syringe pump, whereby the combination may occur at a specified rate. Additionally, the different components of the reaction mixture may be combined in any suitable sequence.

At the first temperature, the at least one reactant is substantially unreactive in the presence of the at least one reagent. As used herein, the term "substantially unreactive" means that no visually detectable reaction occurs. In particular embodiments, the first temperature is less than −5° C., in some embodiments, less than −10° C., in some embodiments, less than −10° C., in some embodiments, less than −20° C., and in some embodiments, less than −25° C.

One purpose of forming the reaction mixture at the first temperature is to allow the at least one reactant and the at least one reagent to form a more homogeneous reaction mixture prior to initiation of the co-condensation reaction. As such, combinations of silane monomers and/or other reactants may be added together at the first temperature, provided that the co-condensation reaction does not occur when the monomers are combined. The first temperature may vary depending on identity and the concentration of the at least one reactant and the at least one reagent. In some embodiments, all of the at least one reactant and/or the at least one reagent are added at the first temperature. However, in some embodiments, some of the at least one reactant and/or the at least one reagent can be added at the second, third and/or other temperature.

In some embodiments, the reaction mixture may be physically homogenized. The reaction mixture may be homogenized by any suitable method, including via mechanical stirring, homogenization devices and the like. In some embodiments, the reaction mixture is homogenized to become substantially homogenous before raising the temperature. As used herein, the term "substantially homogeneous" refers to a reaction mixture wherein the ratio of constituents per unit volume of the mixtures differs by no more than 30% throughout the mixture, in some embodiments by no more than 20%, and in further embodiments, by no more than 10%, 5% or 1%. In some embodiments, the reaction mixture is maintained at the first temperature while being mixed/homogenized. Alternatively, in some embodiments, the temperature may be changed to a different temperature wherein the reactants remain substantially unreactive while the reaction mixture is homogenized.

Raising the Temperature

At some time, for example, when the reaction mixture appears to be homogenous, the temperature of the reaction mixture may be raised to begin the co-condensed reaction. The reaction temperature may be raised to any suitable temperature, including temperatures wherein the reaction occurs slowly and/or temperatures wherein the co-condensation reaction occurs quickly. In some embodiments, the reaction mixture is raised to a temperature wherein the co-condensation reaction is sufficiently complete in less than 5 hours, in some embodiments, in less than 3 hours, and in some embodiments, in less than 1 hour. The term "sufficiently complete" means that while residual monomer may remain, substantially all; of the at least one reactant has reacted. In some embodiments, the reaction mixture is heated to a temperature of greater than 0° C., in some embodiments, greater than 5° C., and in some embodiments, greater than 20° C.

In some embodiments of the invention, methods further include (a) maintaining the reaction temperature of the reaction mixture at the second temperature; and/or (b) raising the temperature of the reaction mixture to a third temperature, such as a temperature that is not less than the second temperature. In some embodiments, the third temperature is less than 50° C., and in some embodiments, less than 40° C. In some embodiments, raising the reaction temperature of the reaction mixture from the second temperature to the third temperature includes increasing the second temperature to the third temperature at a rate of between about 0.1° C. per minute and 10° C. per minute.

Co-Condensed Macromolecules

Also provided according to some embodiments of the invention are co-condensed macromolecules, including co-condensed silica macromolecules such as NO-releasing co-condensed silica macromolecules, formed by a method described herein. In some cases; the methods described herein may produce co-condensed silica macromolecules having improved chemical and physical properties. For example, in some embodiments, the co-condensed silica macromolecules may have improved size and composition uniformity and homogeneity.

For example, in some embodiments, co-condensed silica macromolecules may have relatively narrow particle size distribution. Additionally, it has been discovered that when a labile active pharmaceutical entity (e.g., a NO-releasing functional group such as a diazeniumdiolate) is loaded on one silica monomer, the resulting silica particles may retain higher potency and higher yield with the present process as compared to a traditional process. Additional advantages of methods according to embodiments of the invention may include one or more of the following: process equipment may be simplified; processes may be easier to scale-up with less in-process control; costs of production may be decreased; solvent waste may be decreased; and silica particles may be produced with higher yields of precipitated silica and/or higher recovery of silane reactants as product.

In some embodiments, the yield of the co-condensation reaction, as measured by the ratio of the mass of co-condensed silica product to the mass of silane input materials, is greater than 10%. In some embodiments, the ratio is 40% or greater, 50% or greater, 60% or greater, 70% or greater or greater than 80%.

In addition to yields, the reaction volume per unit of product produced may be reduced according to embodiments of the present invention. For example, prior to use of the current inventive process, a typical base catalyzed silane co-condensation process that was scaled up in a 20 liter reactor would generally produce 20-40 grains per batch. The reaction volume was generally between 0.50-1.0 liter per gram of product produced, with a resulting solid weight recovery at less than 4%. In contrast, the temperature controlled co-condensations according to some embodiments of the present invention can be scaled up to 4.5 liters and produce over 200 grams of product per batch.

Methods according to embodiments of the invention not only may provide better control and programming in process scale up, but they may also significantly cut the reaction volume per unit product to 0.017-0.021 liter per gram of product produced. As such, the process capacity of a set manufacturing facility may be increased, while production cost, waste generation and environmental impact may significantly decrease. Accordingly, some embodiments of the present invention provide a reaction volume per unit of precipitated silica of less than 0.5 liters per gram, in further embodiments, less than 0.25 liters per gram, in some embodiments, less than 0.1 liters per gram, in some embodiments, less than 0.05 liters per gram and, in some embodiments, less than 0.025 liters per gram.

The term "NO-releasing co-condensed silica macromolecules" refers to a structure synthesized from monomeric silane constituents that results in a larger molecular framework with a molar mass of at least 500 Da and a nominal diameter ranging from 0.1 nm-100 μm and may comprise the aggregation of two or more macromolecules, whereby the macromolecular structure is further modified with an NO donor group. For example, in some embodiments, the NO donor group may include diazeniumdiolate nitric oxide functional groups. In some embodiments, the NO donor group may include S-nitrosothiol functional groups.

In some embodiments of the invention, the NO-releasing polysiloxane macromolecules may be in the form of NO-releasing particles, such as those described in U.S. Publication No. 2009/0214618, U.S. patent application Ser. No. 13/256,928, filed Sep. 15, 2011; and U.S. Provisional Application No. 61/526,918, filed Aug. 24, 2011.

EXAMPLES

Example 1

Synthesis of co-condensed silica of N-methylaminopropyltrimethoxysilane (MAP3) and Tetraethoxysilane (TEOS)

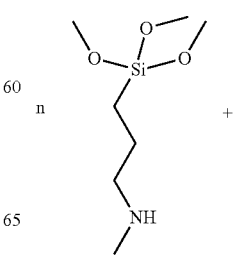

-continued

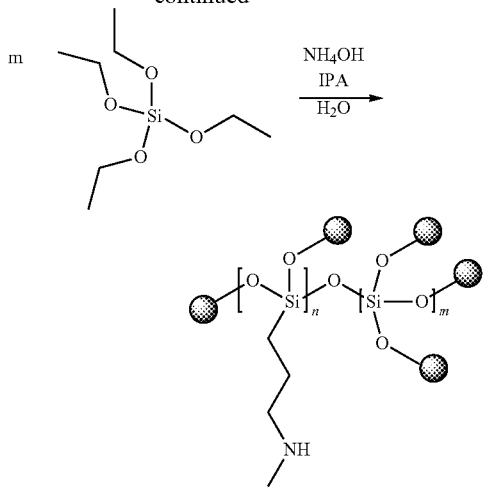

= Silica Network

In a 250 ml round bottom flask, MAP3 (1.74 g, 9.0 mmol) was mixed with 20 ml of Isopropanol. The flask was flashed with nitrogen and then put in an ice/salt bath to chill to −5° C. while stirred magnetically. Into the cold mixture, TEOS (1.88 g, 9.0 mmol) was added. After the temperature stabilized, ammonium hydroxide solution (0.3 ml, 28%) was added. The homogeneous mixture was warmed slowly to room temperature. Solid started to precipitate after 10 minutes at room temperature. The reaction was kept for 2 hours, before the mixture was separated with centrifuge. The solid was washed with dry Ethanol 20 mL twice. The solid was dried overnight at room temperature under vacuum. The reaction produced 2.0 g of off white silica particles.

Example 2

Synthesis of co-condensed silica of N-methylaminopropyltrimethoxysilane-Diazeniumdiolate (MAP3-NO) and TEOS, Lab Scale

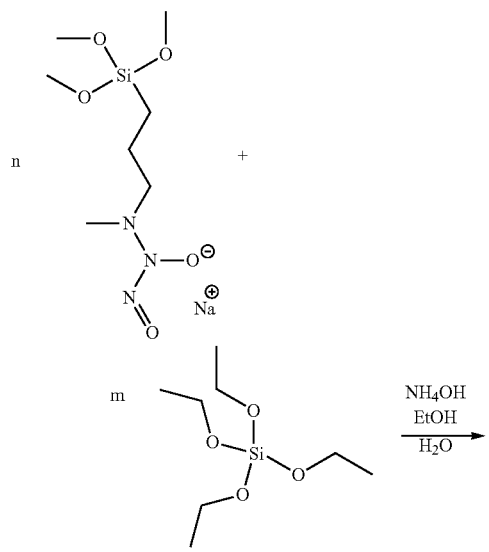

-continued

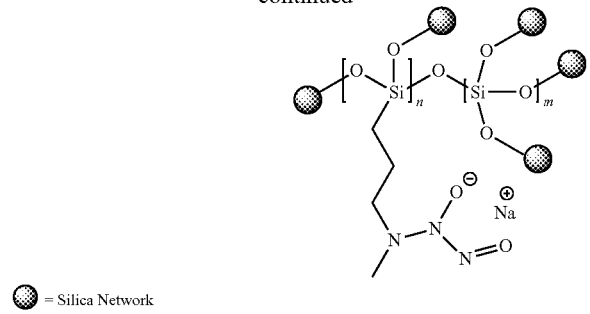

= Silica Network

Both reactors in this reaction Were flashed with nitrogen. In a 2 liter round bottom flask, 500 ml of MeOH solution of sodium methylaminopropyltrimethoxysilaneNONOate (0.31 mol of total silane) was chilled to −15° C. in a dry ice bath. Ethanol (1000 mL) was added into the mixture. Wait till the temperature stabilized to −15° C., tetraethoxysilane (65.1 g, 0.31 mol) was added. After the temperature stabilized, DI Water (25 g, 1.39 mol) was added. Ammonium hydroxide aqueous solution (120 ml, 28%) was pre-chilled to −15° C. and added into the mixture. The mixture was a homogenous clear solution at this point. The content was transferred to a 2 liter jacketed reactor with mechanic stirring. The jacket temperature was set at 14° C. The temperature of the mixture increased to the equilibrium temperature of 14° C. in about 15 minutes. The stirring speed was controlled to be over 800 RPM. Solid started to precipitate after 10-20 minutes at stabilized temperature. The reaction was kept for 3 hours, before the mixture was isolated with nitrogen protected filtration set, using the fine glassfiber filter paper. The wet cake was washed with dry Ethanol 300 mL twice. The solid was air-dried with nitrogen for an hour before transferred to a tray drier. The wet cake weight 122.40 g, and was dried overnight at room temperature under vacuum. The reaction produced 73.3 g of diazeniumdiolate-functionalized co-condensed silica macromolecule.

Example 3

Synthesis of co-condensed silica of N-MethylAminoPropylTrimethoxySilane-Diazeniumdiolate (MAP3-NO) and TEOS, manufacturing scale The 20 liter jacketed reactor was equipped with an air motor, nitrogen inlet and a circulator. Ethanol (6240 g) was dispensed into the reactor. The agitator air pressure was turned on to at least 60 psig. The reactor was chilled to −13° C. over at least 60 minutes. Once the internal temperature reached target, 3645 g of MeOH solution of sodium methylaminopropyltrimethoxysilaneNONOate (2.62 mol of total silane) was charged. The jacket temperature was kept at −13-(−15)° C. Water (Deionized, 202 g, 11.2 mol) was charged followed by TetraEthoxySilane (545 g, 2.62 mol) was added. After the temperature stabilized to −13° C., pre-chilled Ammonium Hydroxide aqueous solution (920 g, 28%) added into the mixture. The Mixture was a homogenous clear solution at this point. Waited till nucleation started to show, for another 5-20 minutes, set the jacket temperature to 10° C. at speed of 2° C. a minute. The reaction was kept for at least 2 but not more than 3 hours. The slurry was then discharged and filtered with nitrogen protected filtration set, using the fine glassfiber filter paper. The wet cake was washed with dry Ethanol 1000 mL twice. The solid was air-dried with nitrogen for an hour before transferred to a tray drier. The wet cake weight 1100 g, and was dried overnight at room temperature under vacuum. The reaction produced 650 g of diazeniumdiolate-functionalized co-condensed silica macromolecule.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of making NO-releasing co-condensed silica macromolecules, comprising:
    forming a reaction mixture by combining at least one reactant and at least one reagent at a first temperature at which the at least one reactant is substantially unreactive in the presence of the at least one reagent; and
    raising the temperature of the reaction mixture to a second temperature at which the at least one silane is reactive in the presence of the at least one reagent,
    raising the temperature of the reaction mixture to a third temperature that is not less than the second temperature and is less than 40° C., wherein raising the reaction temperature of the reaction mixture to the third temperature comprises increasing the second temperature to the third temperature at a rate of less than about 10° C. per minute,
    wherein the reaction of the at least one reactant in the presence of the at least one reagent produces NO-releasing co-condensed silica macromolecules.

2. The method of claim 1, wherein the at least one reactant comprises at least two silane monomers.

3. The method of claim 1, wherein the at least one reagent comprises a base.

4. The method of claim 3, wherein the base comprises ammonium hydroxide.

5. The method of claim 1, wherein the at least one reagent comprises a solvent.

6. The method of claim 5, wherein the solvent comprises an alcohol.

7. The method of claim 1, wherein the at least one silane comprises at least two silane monomers and the at least one reagent comprises a solvent and a base.

8. The method of claim 7, wherein a first of the at least two silane monomers comprises an inorganic silane monomer and a second of the at least two silane monomers comprises an organic silane monomer.

9. The method of claim 8, wherein the inorganic silane monomer comprises tetraethoxysilane and the organic silane monomer comprises diazeniumdiolated-N-methyl(aminopropyl)trimethoxysilane.

10. The method of claim 1, wherein the at least one silane monomer comprises a diazeniumdiolated aminosilane.

11. The method of claim 1, wherein the first temperature is less than −5° C.

12. The method of claim 1, wherein the first temperature is less than −10° C.

13. The method of claim 1, wherein the second temperature is greater than 0° C.

14. The method of claim 1, wherein the second temperature is greater than 5° C.

15. The method of claim 1, further comprising increasing uniformity of the reaction mixture prior to raising the temperature of the reaction mixture.

16. The method of claim 15, wherein the increasing uniformity of the reaction mixture comprises at least one of stirring, mixing, mechanical agitation, high shear homogenization, and/or ultrasound.

17. The method of claim 1, wherein the co-condensed silica macromolecules comprise nanoparticles and/or microparticles.

18. The method of claim 1, wherein the method provides greater than one gram of co-condensed silica per 0.5 liters of reaction mixture.

19. The method of claim 1, wherein the method provides a yield of co-condensed silica macromolecules of greater than 10%.

* * * * *

UNITED STATES PATENT AND TRADEMARK OFFICE
CERTIFICATE OF CORRECTION

PATENT NO. : 8,937,143 B2  
APPLICATION NO. : 13/946186  
DATED : January 20, 2015  
INVENTOR(S) : Bao et al.

Page 1 of 1

It is certified that error appears in the above-identified patent and that said Letters Patent is hereby corrected as shown below:

<u>In the Specification</u>:
Column 1, STATEMENT OF GOVERNMENT SUPPORT, Line 16:
Please correct "grant number 13531" to read -- grant number 1013531 --

<u>In the Claims</u>:
Column 13, Claim 1, Lines 20 and 21: Please correct "one reactant"
 to read -- one silane --

Column 13, Claim 1, Line 22: Please correct "one reactant"
 to read -- one silane --

Column 13, Claim 2, Line 37: Please correct "one reactant"
 to read -- one silane --

Column 14, Claim 10, Line 16: Please correct "monomer comprises a"
 to read -- comprises a --

Signed and Sealed this
Twenty-third Day of June, 2015

Michelle K. Lee
*Director of the United States Patent and Trademark Office*